(12) United States Patent
Hwang (10) Patent No.: US 6,804,202 B1
(45) Date of Patent: Oct. 12, 2004

(54) RADIO PROTOCOL FOR MOBILE COMMUNICATION SYSTEM AND METHOD

(75) Inventor: In Tae Hwang, Kyonggi-do (KR)

(73) Assignee: LG Information and Communications, Ltd., Seoul (KR)

( * ) Notice: Subject to any disclaimer, the term of this patent is extended or adjusted under 35 U.S.C. 154(b) by 0 days.

(21) Appl. No.: 09/484,169

(22) Filed: Jan. 18, 2000

Related U.S. Application Data (63) Continuation of application No. 09/439,612, filed on Nov. 12, 1999.

(30) Foreign Application Priority Data

Apr. 8, 1999 (KR) .......................................... 1999-12255

(51) Int. Cl.[7] ................................................. H04B 1/44
(52) U.S. Cl. ......................... 370/282; 370/466; 370/524
(58) Field of Search .............................. 370/282, 329, 370/437, 466, 524

(56) References Cited

U.S. PATENT DOCUMENTS

| | | | | |
|---|---|---|---|---|
| 5,946,634 A | * | 8/1999 | Korpela ................... | 455/552.1 |
| 6,307,867 B1 | * | 10/2001 | Roobol et al. .............. | 370/470 |
| 6,363,058 B1 | * | 3/2002 | Roobol et al. .............. | 370/310 |
| 6,374,112 B1 | * | 4/2002 | Widegren et al. ......... | 455/452.2 |
| 6,385,451 B1 | * | 5/2002 | Kalliokulju et al. ........ | 455/437 |
| 6,434,133 B1 | * | 8/2002 | Hamalainen ................ | 370/338 |
| 6,477,670 B1 | * | 11/2002 | Ahmadvand ................ | 714/712 |

FOREIGN PATENT DOCUMENTS

WO     WO 98/48581     10/1998

OTHER PUBLICATIONS

Nikula, E.; Toskala, A.; Dahlman, E.; Girard, L.; Klein, A., "FRAMES multiple access for UMTS and IMT–2000," IEEE Personal Communications, Apr. 1998, vol. 5, Issue 2, pp. 16–24 (ISSN: 1070–9916).

Roobol, C.; Beming, P.; Lundsjö, J.; Johansson, M., "A proposal for an RLC/MAC Protocol for Wideband CDMA Capable of Handling Real Time and Non Real Time Services," 48th IEEE Vehicular Technology Conference, May 18–21, 1998, pp. 107–111.

\* cited by examiner

*Primary Examiner*—Hassan Kizou
*Assistant Examiner*—D Levitan
(74) *Attorney, Agent, or Firm*—Fleshner & Kim, LLP (57) ABSTRACT

Radio protocol for a next generation mobile communication system is disclosed including a radio link control layer for connecting to an upper layer through a service access point provided in advance and for connecting to a lower layer through a plurality of logic channels provided in advance. The radio link control layer includes at least one radio link control entity for transmission/reception of data to/from up-link or down-link according to a form of a data transmission mode.

51 Claims, 4 Drawing Sheets

RADIO PROTOCOL FOR MOBILE COMMUNICATION SYSTEM AND METHOD

This application is a Continuation of application Ser. No. 09/439,612 filed Nov. 12, 1999.

BACKGROUND OF THE INVENTION

1. Field of the Invention

The present invention relates to a next generation mobile communication system and more particularly to a protocol on radio access standards based on Universal Mobile Telecommunication System (UMTS) being developed and standarized by the European Telecommunications Standard Institute (ETSI).

2. Background of the Related Art

Today, as the society is developed to a highly information oriented society, the communication network is developing to one unified radio system which can deal with all services. As a new communication field, though the mobile communication has been grown rapidly up to now, services of the mobile communication up to now are mostly for speech and are available only in restricted regions. However, it is foreseen that the future mobile communication system can transmit not only speech, but also even character, image, and multimedia information, and services of which will be made available any place in the world by means of an international perfect roaming. Particularly, since the joint development of a second generation mobile system called DCS-1800 which serves the Global System for Mobile Communication (GSM) at an 1800 MHz frequency band, Europe, lead by the ETSI, is under development of the UMTS.

The UMTS is a next generation mobile communication scheme developed independently based on the Code Division Tested (CODIT) and the Asynchronous Time Division Multiplexing Access (ATDMA), which are researches on the radio access standards of which UMTS is conducted as one of projects of the Research and Development in Advanced Communication Technology in Europe (RACE). Basically, the radio access standard protocol architecture suggested by the UTMS until now includes, from the bottom, a Physical Layer (PHY), a Medium Access Control Layer (MAC), a Radio Link Control Layer (RLC), a Radio Resource Control Layer (RRC), and a Higher Layer. However, those protocol layers are still being developed to be implemented in the next generation mobile communication service. That is, there have been ceaseless demand for selecting the appropriate protocol architecture which meets both the objective criterias of the radio access standards such as spectrum efficiency, range of service and power efficiency, and the subjective criteria of the radio access standards such as complexity of the system, service quality, flexibility of radio technology and network.

SUMMARY OF THE INVENTION

Accordingly, an object of the present invention is to solve at least the problems and disadvantages of the related art.

An object of the present invention is to provide a radio protocol for the next generation mobile communication system and a method for managing the mobile communication system. The radio protocol includes a RLC which conducts radio link control functions according to a data transmission mode for supporting a variety of the next generation mobile communication services which will be developed in the future.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein, the radio protocol for a next generation mobile communication system includes a radio link control layer for connecting to an upper layer through a service access point provided in advance and for connecting to a lower layer through a plurality of logic channels also provided in advance. The radio link control layer includes at least one radio link control entity for transmission/reception of data to/from the up-link or down-link according to the form of the data transmission mode.

Preferably, the radio link control layer includes a RLC-transparent entity either for receiving a Service Data Unit (SDU) from the upper layer, dividing the SDU into a plurality of Protocol Data Units (PDUs) and providing the PDUs to the lower layer, or for receiving the plurality of PDUs from the lower layer, reassembling the PDUs into an SDU and providing the SDU to the upper layer; a RLC-unacknowledged entity either for receiving the SDU from the upper layer, conducting framing in which the SDU is divided into a plurality of PDUs wherein a header is inserted into each of the PDUs and providing the PDUs to the lower layer, or for receiving a plurality of PDUs from the lower layer, separating a header from each of the PDUs, reassembling the PDUs into the SDU depending on presence of error and providing the SDU to the upper layer; and a RLC-acknowledged entity for correcting an error in the PDU or retransmitting the PDU depending on the presence of an error in the plurality of PDUs received from the lower layer.

The radio link control layer further includes a multiplexing/demultiplexing block for multiplexing and demultiplexing the PDUs so that some of the provided radio link control entities are connected to the lower layer through the plurality of logic channels.

BRIEF DESCRIPTION OF THE DRAWINGS

The invention will be described in detail with reference to the following drawings in which like reference numerals refer to like elements wherein.

DETAILED DESCRIPTION OF THE PREFERRED EMBODIMENT

In a radio protocol architecture for the next generation mobile communication system, a MAC switches transport channels according to a monitoring result of a channel state to process multiple dedicated logical channels. Also, the Frequency Division Duplexing (FDD) or the Time Division Duplexing (TDD) may be implemented as the transmission-reception separating system in the next generation mobile communication system. The RLC protocol architecture of the present invention supports the FDD, and can also support the TDD for certain cases.

Figure 1:
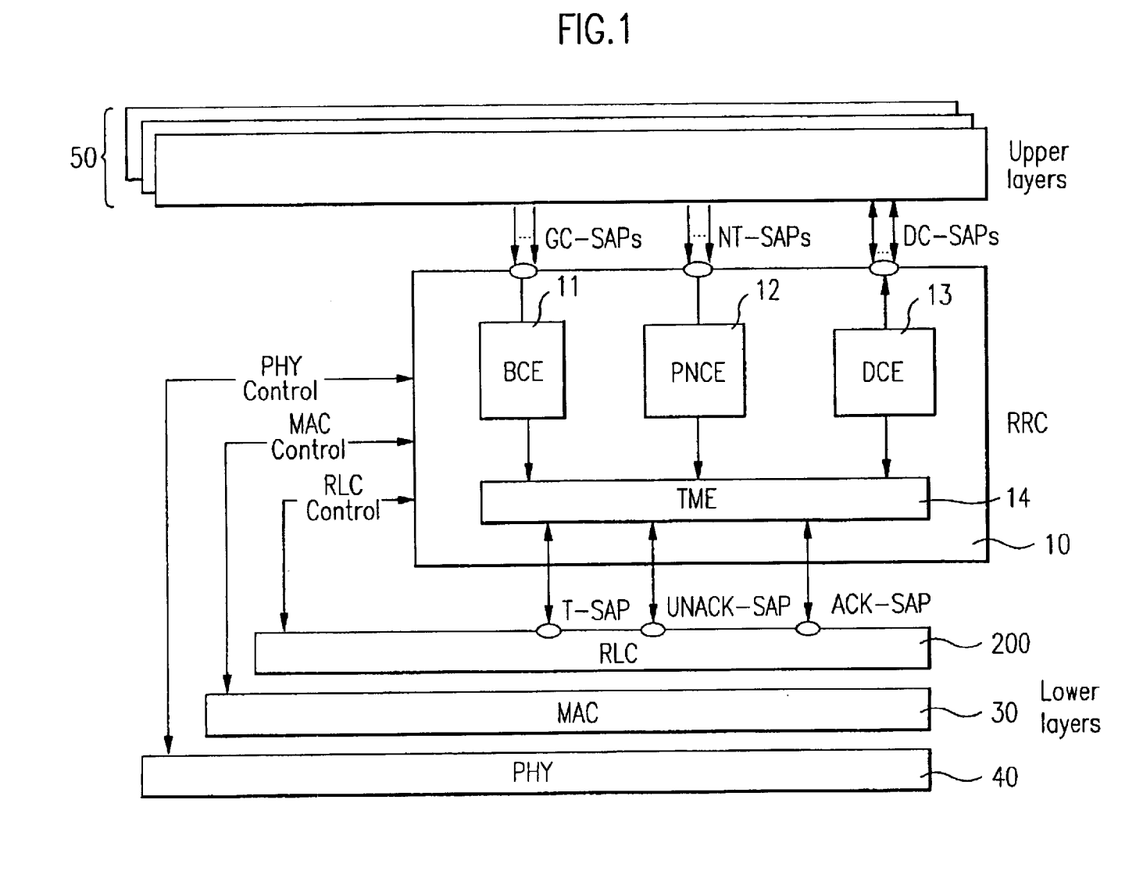
FIG. 1 is a block diagram showing a RRC for UTRAN in the next generation mobile communication system in accordance with the present invention.
Figure 2:
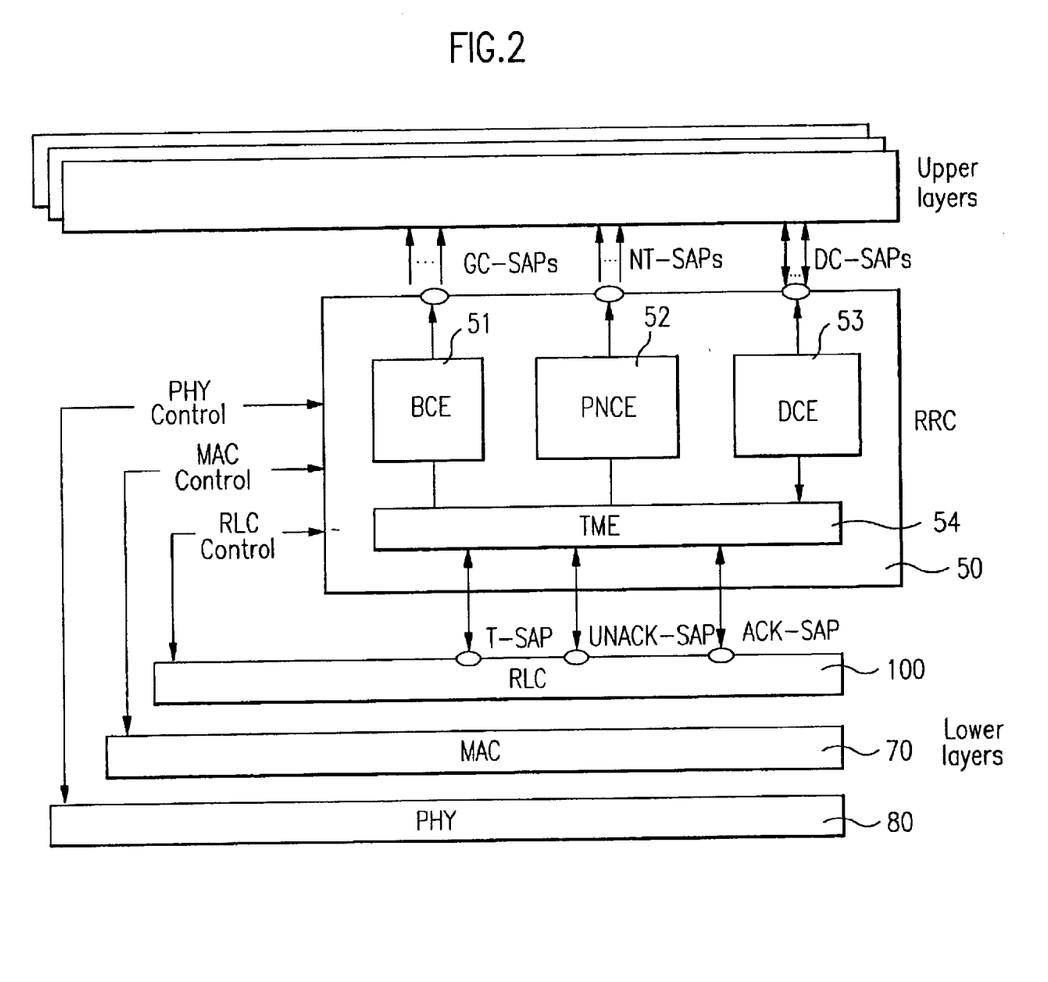
FIG. 2 is a block diagram showing a radio protocol architecture and RRC for UE in the next generation mobile communication system in accordance with the present invention in detail.

Reference will now be made in detail to the preferred embodiments of the present invention, examples of which are illustrated in the accompanying drawings. FIG. 1 illustrates a block diagram showing a detail of RRC for a Universal Terrestrial Radio Access Network (UTRAN) in a next generation mobile communication system in accordance with the present invention, and FIG. 2 illustrates a block diagram showing a radio protocol architecture and RRC for User Equipment (UE) in a next generation mobile communication system in accordance with the present invention. The RRC architecture model of the present invention is provided for supporting a UMTS control plane and a FDD mode, and can also support a TDD mode.

Referring to FIG. 1, the RRC 10 in a communication system of the present invention provided for the next generation mobile communication system is disposed between an upper layer and a lower layer. The upper layer for radio transmission control and for mobile station management includes a Call Control (CC) entity, a Mobility Management (MM) entity, a Radio resource Management entity and a Packet Management entity. The lower layer includes a PHY 40, a MAC 30, and a RLC 200.

In this instance, the RRC 10 includes a Broadcast Control Entity (BCE) 11 for controlling broadcast information provided from a user side Access Stratum (AS) or Non Access Stratum (NAS), called an upper layer collectively; a Paging and Notification Control Entity (PNCE) 12 for providing paging and notification information from the upper layer; a Dedicated Control Entity (DCE) 13 for providing services on setting/canceling connection and transmission of a message from the upper layer; and a Transfer Mode Entity (TME) 14 for mapping (fixing a transport path) the BCE 11, the PNCE 12 and the DCE 13 to an access point of the RLC in the lower layer.

A method for controlling a radio resource by the aforementioned network side RRC of the present invention will be explained. The present invention suggests to provide separate entities for processing different messages according to the messages transferred between the RLC 200 and the upper layer or the lower layer, or between he upper layer and the lower layer.

First, characteristics of the message to be transported from the upper layer to the RRC are made known. The characteristics of the message to be transported from the upper layer to the RRC is determined. Namely, whether the message is broadcast message information, paging and notification information, or information on setting/canceling connection and transmission of a message. As a result of the determination, the broadcast message information is transmitted to the BCE 11, the paging and notification information is transmitted to the PNCE 12, and the information on setting/canceling connection and transmission of a message from the upper layer is transmitted to the DCE 13. The message provided to the RRC 10 is processed in one of the following three message processing procedure depending on a service function of the message. That is, the RRC 10 of the present invention has the BCE 11 for processing a message only required for transmission, the PNCE 12 for processing the paging message or the notification message, and the DCE 13 for processing an important message, such as a packet or speech.

The TME 14 next determines a transfer mode of the message processed in the preset signal processing procedure and determines a path for forwarding the message, i.e. conducts a mapping according to the characteristics and transfer mode of the message. That is, the TME 14 controls how to map from the BCE 11, the PNCE 12, or the DCE 13 in the RRC to an Service Access Point (SAP) (T-SAP, UNACK-SAP and ACK-SAP) of RLC 200. In this instance, comparing the received message form and the present service form, the BCE 11 is mapped to either a Transparent-SAP (T-SAP) or an Unacknowledge-SAP (UNACK-SAP), the PNCE 12 is mapped to either the T-SAP or the UNACK-SAP, and the DCE 13 is mapped to one of the T-SAP, the UNACK-SAP or an Acknowledge-SAP (ACK-SAP).

The BCE 11 controls the demultiplexing of an upper layer message received by a peer entity from an another upper layer entity (for example, the user side MM entity), and controls the multiplexing of a lower layer message received from a sub entity (for example, a BCE in UTRAN) of the RLC 200. The BCE 11 supports an upper layer service using a General Control Service Access Points (GC-SAPs), and may use a lower layer (RLC 200) service provided by the T-SAP, or UNACK-SAP. In this instance, the T-SAP transmits a message from an upper layer to the RLC 200, and the UNACK-SAP requires no confirmation on received message.

The PNCE 12 controls demultiplexing of an upper layer message received by a peer entity from an another upper layer entity (for example, the user side(UE) MM entity), and controls the multiplexing of a lower layer message received from a sub entity (for example, a PNCE in UTRAN) of the RRC 10. The PNCE 12 supports the upper layers through a Notification-SAPs (NT-SAPs), and may use a lower layer (RLC 200) service provided through the T-SAP or UNACK-SAP. The DCE 13 controls the demultiplexing of an upper layer message received by a peer entity from another upper layer entity (for example, the MM entity in the user entity and a RNAP in network (UTRAN) side), and controls the multiplexing of a lower layer message received from a sub entity (for example, UE and a DCE in UTRAN side) of the RRC 10. The DCE 13 supports the upper layers through a Dedicated Control-SAPs (DC-SAPs), and can use a lower layer (RLC 200) service provided through the T-SAP, ACK-SAP, or UNACK-SAP.

The ACK-SAP transfers a message from the upper layer to the lower layer(RLC 200), and requests for confirmation on the message transfer, so that the upper layer makes confirmation on transfer of the message.

In a RRC in the UE use state as shown in FIG. 2, upon reception of a message at the RLC 100 in the lower layer, the RLC 100 determines characteristics of the message, and forwards the message to the TME 54 in RRC 50 through T-SAP, UNACK-SAP or ACK-SAP depending on the characteristics. The TME 54 transfers a message received through the T-SAP, UNACK-SAP, or ACK-SAP in the RLC 100 to one of the BCE 51, PNCE 52 and the DCE 53. That is, the message is transferred to respective entities 51, 52 and 53 depending on whether the message is a broadcast message, paging and notification message of a message, such as speech or packet. Then, the BCE 51, the PNCE 52 and DCE 53 process the message signal according to the characteristics of the respective entities, and transfer the processed signal to the upper layer through the GC-SAPs, NT-SAPs and DC-SAPs in the RRC 50.

Figure 3:
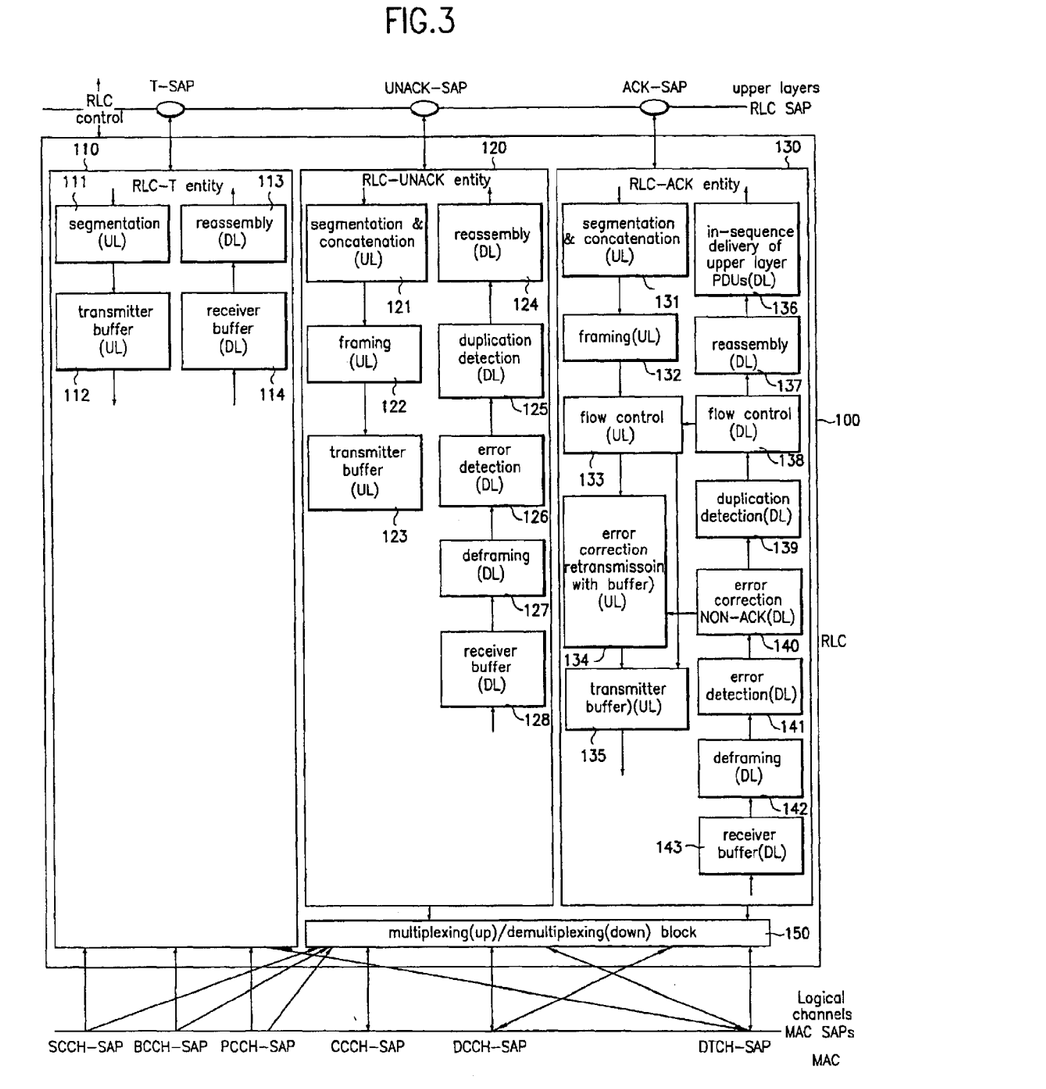
FIG. 3 is a block diagram showing a radio protocol architecture and RLC for UE in the next generation mobile communication system in accordance with the present invention in detail.
Figure 4:
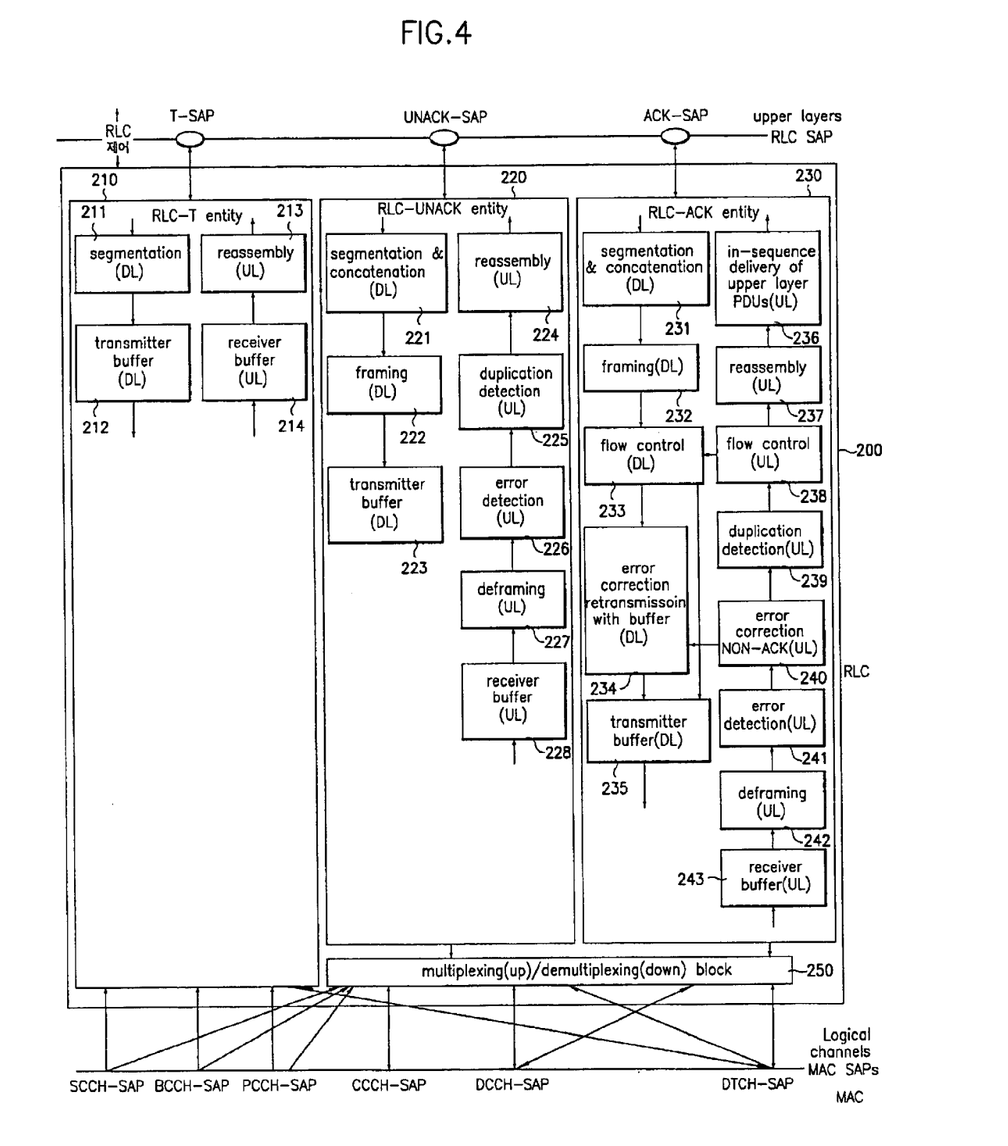
FIG. 4 is a block diagram showing a radio protocol architecture and RLC for UTRAN in a next generation mobile communication system in accordance with the present invention in detail.

FIG. 3 illustrates a block diagram showing a radio protocol architecture and RLC for UE in a next generation mobile communication system in accordance with the present invention, and FIG. 4 illustrates a block diagram showing a radio protocol architecture and RLC for UTRAN in a next generation mobile communication system in accordance with the present invention. The present invention will be explained centered on FIG. 3 as the radio protocol of the UTRAN shown in FIG. 4 is almost the same with the radio protocol in the UE shown in FIG. 3.

Referring to FIG. 3, the RLC 100 is provided with different SAPs for access to the upper layer, such as T-SAP, UNACK-SAP and ACK-SAP. The "RLC control" between the upper layer and the RLC 100 will be explained in detail. The entities 110, 120 and 130 in the RLC 100 have different forms of data transfer modes and functions. The RLC-transparent (RLC-T) entity 110 controls a data flow to logic channels, such as SCCH (Supplemental Code Common Channel), BCCH (Broadcast Control Channel), PCCH (Paging Control Channel) and DTCH Dedicated Traffic Channel), through a logic channel SAP connected to the MAC. The RLC-T 110 is provided with both a segmentation block 111 and a transmitter buffer block 112 in an up-link from the UTRAN and, as will be explained later, a RLC-T 210 in FIG. 4 is also provided with a segmentation block 211 and a transmitter buffer block 212 in a down-link from the UE. The RLC-T 110 is also provided with a reassembly block 113 and a receiver buffer block 114 in a down-link from the UTRAN, and RLC-T 210 has a reassembly block 213 and a receiver buffer block 214 in an up-link from the UE.

When the UE is viewed as a transmitter side, the RLC-T 110 receives a Service Data Unit (SDU) from the upper layer at first. Then, the segmentation block 111 in the RLC-T divides the SDU into a plurality of Protocol Data Units (PDUs), each having no header, and transfers the PDUs to the MAC through the transmitter buffer block 112. Opposite to this, when the UE is viewed as a receiver side, the RLC-T entity 110 receives PDUs from the MAC through the receiver buffer block 114. Then, the reassembly block 113 in the RLC-T entity 110 reassembles the PDUs into SDUs and forwards the SDUs to the upper layer.

A RLC-Unacknowledged (RLC-UNACK) entity 120 controls a data flow to a logic channel, such as SCCH, BCCH, PCCH, CCCH and DTCH, through a logic channel SAP connected to the MAC. The RLC-UNACK entity 120 is provided with a segmentation and concatenation block 121, a framing block 122, and a transmitter buffer block 123, which are in an up-link to the UTRAN, and a RLC-UNACK entity 220 of FIG. 4 is also provided with a segmentation and concatenation block 221, a framing block 222, and a transmitter buffer block 223, which are in a down-link to the UE. Moreover, the RLC-UNACK entity 120 is provided with a reassembly block 124, a duplication detection block 125, an error detection block 126, a deframing block 127 and a receiver buffer block 128, which are in a down-link from the UTRAN, and the RLC-UNACK entity 220 is provided with reassembly block 224, a duplication detection block 225, an error detection block 226, a deframing block 227, and a receiver buffer block 228, which are in a up-link from the UE.

When the UE is viewed as a transmitter side, the RLC-UNACK entity 120 receives the SDU from the upper layer at first. Then, the RLC-UNACK entity 120 divides the SDU into a plurality of PDUs, each having a header by framing, and forwards the PDUs to the MAC through the transmitter buffer block 123. In dividing the SDU into PDUs, a concatenation function is conducted at the same time, to appropriately divide the SDU into PDUs. The concatenation function is a procedure to insert a portion of a next data into a reserved space (PAD) in a PDU. Opposite to this, when the UE is viewed as a receiver side, the RLC-UNACK entity 120 receives the PDUs from the MAC through the receiver buffer block 128, separates headers from the PDUs received at the deframing block 127 in the RLC-UNACK, and detects presence of error in each PDU. If presence of error in the PDU is detected, the PDU is discarded and a presence of a duplicate PDU within PDUs from which no errors have been detected is detected. In this instance, if a duplicate PDU is detected as having no error, the duplicate PDU is provided to the reassembly block 124 once. The reassembly block 124 reassembles the received PDUs into the SDU again, and provides the SDU to an upper layer of the reassembly block.

The RLC-Acknowledged (RLC-ACK) entity 130 controls a data flow to a logic channel, such as DCCH and DTCH through a logic channel SAP connected to the MAC. The RLC-ACK entity 130 is provided with segmentation and concatenation block 131, a framing block 132, a flow control block 133, an error correction and retransmission block 134 and a transmitter block 135, which are in an up-link to the UTRAN, and a RLC-ACK entity 230 of FIG. 4 also has corresponding identical blocks 231~235 in a down-link to the UE. Moreover, the RLC-ACK entity 130 has an in-sequence delivery of upper layer PDU block 136, a reassembly block 137, a flow control block 138, a duplication detection block 139, an error correction block 140, an error detection block 141, a deframing block 142 and a receiver buffer block 143, which are in a down-link from the UTRAN, and the RLC-ACK entity 230 has corresponding identical blocks 236~243 in an up-link from the UE.

When the UE is viewed as a transmitter side, the RLC-ACK entity 130 receives an SDU from an upper layer at first. Then, the segmentation and concatenation block 131 in the RLC-ACK entity 130 divides the SDU into a plurality of PDUs, each having a header from framing. In dividing the SDU into the PDUs, a concatenation function is also conducted to appropriately divide the SDU into PDUs. According to this, the RLC 100 processes a transmission speed based on flow status information of peer RLC, and then detects acknowledgement on transmission of each PDU by the peer RLC. If the RLC 100 detects that there is no acknowledgement on transmission of each PDU, the RLC 100 should multiplex the present PDUs, and retransmit the PDU. Upon completion of the up-link operation of the RLC-ACK entity, the RLC 100 transfers the PDUs to the MAC through the transmission buffer 135.

Opposite to this, when the UE is viewed as a receiver side, the RLC-ACK entity 130 receives the PDUs from the Mac through the receiver buffer 143, separates headers from the PDUs received at the deframing block 142 and detects presence of error in each PDU. If there is an error in the PDU, the RLC 100 requests an unacknowledged peer RLC to retransmit a PDU, and detects a duplicate PDU. In this instance, if there is a PDU, the duplicated PDU is provided once to the flow control block 138. Thereafter, the RLC 100 provides flow status information to the peer RLC and maintains a PDU stream to be transmitted to an upper layer by reassembling the PDUs into SDU.

Table 1 shows functions of respective RLCs 110, 120 and 130 in the UE of FIG. 3. Also, Table 2 shows functions of respective RLCs 210, 220 and 230 in the UTRAN of FIG. 4. In the present invention, the RLC 100 has additional functions other than the functions of the blocks explained with reference to FIGS. 3 and 4, and RLC functions listed in Tables 1 and 2. The additional function is a framing/deframing, which is a function for controlling separation/combination of the header inserted in to PDU. The RLC architecture explained up to now is related to forms and RLC data transmission modes and RLC functions.

TABLE 1

| | Entity function | Logic channel | SCCH | BCCH | PCCH | CCCH | DCCH | DTCH |
|---|---|---|---|---|---|---|---|---|
| Up-link (TX) | RLC-T entity | | | | | | | V |
| | | Segmentation | | | | | | V |
| | RLC-UNACK entity | | | | | V | V | V |
| | | Segmentation | | | | V | V | V |
| | | Concatenation | | | | V | V | V |
| | | Framing | | | | V | V | V |
| | RLC-ACK entity | | | | | | V | V |
| | | Segmentation | | | | | V | V |
| | | Concatenation | | | | | V | V |
| | | Framing | | | | | V | V |
| | | Flow control | | | | | V | V |
| | | Error correction (retransmission) | | | | | V | V |
| Down-link (RX) | RLC-T entity | | V | V | V | | | V |
| | | Reassembly | V | V | V | | | V |
| | RLC-UNACK entity | | V | V | V | V | V | V |
| | | Deframing | V | V | V | V | V | V |
| | | Error detection | V | V | V | V | V | V |
| | | Duplication detection | V | V | V | V | V | V |
| | | Reassembly | V | V | V | V | V | V |
| | RLC-ACK entity | | | | | | V | V |
| | | Deframing | | | | | V | V |
| | | Error detection | | | | | V | V |
| | | Error correction (NON-ACK) | | | | | V | V |
| | | Duplication detection | | | | | V | V |
| | | Flow control | | | | | V | V |
| | | Reassembly | | | | | V | V |
| | | In-sequence delivery of upper layer PDUs | | | | | V | V |

TABLE 2

| | Entity function | Logic channel | SCCH | BCCH | PCCH | CCCH | DCCH | DTCH |
|---|---|---|---|---|---|---|---|---|
| Up-link (TX) | RLC-T entity | | V | V | V | | | V |
| | | Segmentation | V | V | V | | | V |
| | RLC-UNACK entity | | V | V | V | V | V | V |
| | | Segmentation | V | V | V | V | V | V |
| | | Concatenation | V | V | V | V | V | V |
| | | Framing | V | V | V | V | V | V |
| | RLC-ACK entity | | | | | | V | V |
| | | Segmentation | | | | | V | V |
| | | Concatenation | | | | | V | V |
| | | Framing | | | | | V | V |
| | | Flow control | | | | | V | V |
| | | Error correction (retransmission) | | | | | V | V |
| Down-link (RX) | RLC-T entity | | | | | | | V |
| | | Reassembly | | | | | | V |
| | RLC-UNACK entity | | | | | V | V | V |
| | | Deframing | | | | | V | V | V |
| | | Error detection | | | | | V | V | V |
| | | Duplication detection | | | | | V | V | V |
| | | Reassembly | | | | | V | V | V |
| | RLC-ACK entity | | | | | | V | V |
| | | Deframing | | | | | V | V |
| | | Error detection | | | | | V | V |
| | | Error correction (NON-ACK) | | | | | V | V |
| | | Duplication detection | | | | | V | V |
| | | Flow control | | | | | V | V |
| | | Reassembly | | | | | V | V |
| | | In-sequence delivery of upper layer PDUs | | | | | V | V |

As has been explained, the radio protocol for the next generation mobile communication system of the present invention is favorable for implementing a variety of services in the next generation mobile communication system because the radio protocol of the present invention can carry out an effective radio link control between the RRC, an upper layer and the MAC, a lower layer, according to a RLC data transmission mode.

The foregoing embodiments are merely exemplary and are not to be considered as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A method of operating a communication system having an upper layer, a radio resource control layer (RRC) and a radio link control layer (RLC), comprising:

(a) transferring a message from said upper layer to said RRC through a path group corresponding to a characteristic of said message among a plurality of path groups;

(b) processing said message according to one of a plurality of first entities corresponding to said characteristics at said RRC; and (c) determining one among a plurality of transfer paths corresponding to said processed message at a transfer mode entity of said RRC;

(d) transferring said processed message from said RRC to said RLC through said determined path at said RLC; and (e) processing said message transferred at a corresponding one among a plurality of said second entities in said RLC, wherein said plurality of first entities are broadcasting control entity (BCE) for controlling a broadcast message information for transmission, notification control entity (PNCE) for processing paging message or notification message, and dedicated control entity (DCE) for processing an important message.

2. A method as claimed in claim 1, wherein said characteristic of said message is any one of broadcast message information, paging and notification information, said information on setting/canceling connection and transmission of said message.

3. A method as claimed in claim 1, wherein said a plurality of path groups at said RRC are notification service access point group corresponding to said PNCE, dedicated control service access point group corresponding to said DCE and general control service access point group corresponding to said BCE.

4. A method as claimed in claim 3, wherein said plurality of transfer paths at said RLC include a transparent service access point (T-SAP), an unacknowledged service access point (UNACK-SAP) and an acknowledge service access point (ACK-SAP), wherein a transfer mode entity (TME) controls how to map from said BCE, PNCE, or DCE in said RRC to a Service Access Point (SAP) of said T-SAP, UNACK-SAP and ACK-SAP in said RLC.

5. A method as claimed in claim 4, wherein said BCE is mapped to either said T-SAP or said UNACK-SAP, said PNCE is mapped to either said T-SAP or said UNACK-SAP, and said DCE is mapped to one of said T-SAP, UNACK-SAP and said ACK-SAP.

6. A method as claimed in claim 4, wherein said plurality of second entities of said radio link layer includes a RLC-T entity corresponding to said T-SAP, a RLC-UNACK entity corresponding to said UNACK-SAP, and a RLC-ACK entity corresponding to said ACK-SAP.

7. A method as claimed in claim 6, said RLC-T entity performs segmentation and/or buffering.

8. A method as claimed in claim 6, said RLC-UNACK entity performs segmentation and concatenation, framing, and/or buffering.

9. A method as claimed in claim 6, said RLC-ACK entity performs segmentation and concatenation, framing, flow control, error correction and/or retransmission, and/or buffering.

10. The method of claim 1, wherein the important message is a message specific for a user entity.

11. The method of claim 1 or 10, wherein the important message includes at least one of speech data or packet data.

12. A method of operating a communication system having an upper layer, a radio resource control layer (RRC) and a radio link control layer (RLC), comprising:

(a) receiving a message using a lower layer at said RLC;

(b) processing said received message by a corresponding one among a plurality of first entities in said RLC;

(c) transferring said processed message from said RLC to said RRC through a corresponding path among a plurality of paths;

(d) determining among a plurality of second entities of said RRC to receive said transferred message by a transfer mode entity of said RRC;

(e) processing said message through said determined second entity of said RRC; and (f) transferring said message from said RRC to said upper layer through a path group corresponding to a characteristic of said message among a plurality of path groups of said RRC, wherein said plurality of second entities in said RRC, are broadcasting control entity (BCE) for controlling a broadcast message information for transmission, notification control entity (PNCE) for processing paging message or notification message, and dedicated control entity (DCE) for processing an important message.

13. A method as claimed in claim 12, wherein said characteristic of said message is any one of broadcast message information, paging and/or notification information, and information on setting/canceling connection and transmission of said message.

14. A method as claimed in claim 12, wherein said plurality of second entities in said RRC are broadcasting control entity (BCE) for processing a broadcast message information for transmission, notification control entity (PNCE) for processing paging message or notification message, said dedicated control entity (DCE) for processing an important message.

15. A method of operating a communication system having an upper layer, a radio resource control layer (RCL) and a radio link control layer (RLC), comprising:

(a) receiving a message through a lower layer at said RLC;

(b) processing said received message by a corresponding one among a plurality of first entities in said RLC;

(c) transferring said processed message from said RLC to said RRC through a corresponding path among a plurality of paths;

(d) determining among a plurality of second entities of said RRC to receive said transferred message by a transfer mode entity of said RRC;

(e) processing said message through said determined second entity of said RRC; and (f) transferring said message from said RRC to said upper layer through a path group corresponding to a characteristic of said message among a plurality of path groups of said RRC;

wherein said a plurality of path groups at said RRC are notification service access point group corresponding to a notification control entity (PNCE), dedicated control service access point group corresponding to a dedicated control entity (DCE) and general control service access point group corresponding to a broadcast control entity (BCE).

16. A method as claimed in claim 15, wherein said plurality of paths at said RLC include a transparent service access point (T-SAP), an unacknowledged service access point (UNACK-SAP) and an acknowledge service access point (ACK-SAP), wherein a transfer mode entity (TME) controls how to map from said BCE, PNCE, or DCE in said RRC to a Service Access Point (SAP) of said T-SAP, UNACK-SAP and ACK-SAP in said RLC.

17. A method as claimed in claim 16, wherein said BCE is mapped to either said T-SAP or said UNACK-SAP, said PNCE is mapped to either said T-SAP or said UNACK-SAP, and said DCE is mapped to one of said T-SAP, UNACK-SAP and said ACK-SAP.

18. A method as claimed in claim 16, wherein said radio link layer (RLC) includes a RLC-T entity corresponding to said T-SAP, a RLC-UNACK entity corresponding to said UNACK-SAP, and a RLC-ACK entity corresponding to said ACK-SAP.

19. A method as claimed in claim 18, wherein said RLC-T entity perform reassembling and/or buffering.

20. A method as claimed in claim 18, wherein said RLC-UNACK entity performs reassembling, duplication detection, error detection, deframing, and/or buffering.

21. A method as claimed in claim 18, wherein said RLC-ACK entity performs in-sequence delivery to an upper layer, reassembling, flow control, duplication detection, error correction, error detection, deframing, and/or buffering.

22. A method comprising:
performing a function by a lower layer according to a control signal from an upper layer; and
performing a function by a radio link control (RLC) layer according to a control signal from the upper layer, the radio link control layer providing the following functions:
converting service data units (SDUs) received from the upper layer to protocol data units (PCUs) and transferring the protocol data units to the lower layer using a transmission transparent entity;
reassembling the protocol data units received from the lower layer into service data units for transfer to the upper layer using a reception transparent entity;
converting the service data units received from the upper layer into a plurality of protocol data units, and adding a header to the protocol data units to be transferred to the lower layer using a transmission unacknowledged entity;
removing the header from the protocol data units received from the lower layer, and reassembling the protocol data units after header removal into service data units to be transferred to the upper layer using a reception unacknowledged entity;
converting the service data units received from the upper layer into protocol data units, adding a header to the converted protocol data units to be stored for retransmission and/or transferring the header-added protocol data units to the lower layer through at least one channel using a transmission acknowledged entity; and carrying out an error correction on the protocol data units received from the lower layer through the at least one logical channel, and/or reassembling the protocol data units after header removal into service data units to be transferred to the upper layer using a reception acknowledged entity.

23. The method of claim 22, wherein the method is implemented in a UTRAN (universal terrestrial radio access network) or a UE (user equipment).

24. The method of claim 22, wherein the upper layer provides the radio link control (RLC) layer and the lower layer with the control signals for the radio link control and the lower layer, respectively, the upper layer is a radio resource control (RRC) layer transmitting/receiving the service data units to/from the radio link control layer through transparent, unacknowledged, and acknowledged service access points provided by the radio link control layer, and the lower layer is a medium access control (MAC) sublayer performing a function according to the corresponding control signal.

25. The method of claim 22, wherein the transmission transparent entity segments the service data units received from the upper layer through a transparent service access point into the protocol data units, and transfers the protocol data units to the lower layer through at least one logical channel.

26. The method of claim 25, wherein the at least one logical channel includes a dedicated traffic channel (DTCH) if the method is implemented in a user equipment.

27. The method of claim 25, wherein the at least one logical channel includes a broadcast control channel (BCCH), a paging control channel (PCCH), and/or a dedicated traffic channel (DTCH) if the method is implemented in a UTRAN (universal terrestrial radio access network).

28. The method of claim 22, wherein the reception transparent entity performs:
buffering of the protocol data units, which are header-free, received through at least one logical channel; and
reassembling the buffered protocol data units into the service data units and transferring the reassembled service data units to the upper layer through a transparent mode service access point.

29. The method of claim 28, wherein the at least one logical channel includes a dedicated traffic channel (DTCH) if the method is implemented in a UTRAN (universal terrestrial radio access network).

30. The method of claim 28, wherein the at least one logical channel includes a broadcast control channel (BCCH), a paging control channel (PCCH), and/or a dedicated traffic channel (DTCH) if the method is implemented in a user equipment.

31. The method of claim 22, wherein the transmission unacknowledged entity performs:
carrying out segmentation and/or concatenation on the service data units received from the upper layer through an unacknowledged service access point (UNACK-SAP) for conversion into a plurality of the protocol data units; and
adding a header to the protocol data units to be transferred to the lower layer through at least one logical channel.

32. The method of claim 31, wherein the concatenation is a process of inserting a portion of one service data unit in a surplus portion of a protocol data unit constituted with another service data unit.

33. The method of claim 31, wherein the at least one logical channel includes a shared control channel, a common control channel, a dedicated control channel, and/or a dedicated traffic channel if the method is implemented in a UTRAN (universal terrestrial radio access network).

34. The method of claim 31, wherein the at least one logical channel includes a dedicated control channel (DCCH) and a dedicated traffic channel (DTCH) if the method is implemented in a user equipment.

35. The method of claim 22, wherein the reception unacknowledged entity performs:

buffering of the protocol data units received through at least one logical channel;

removing the header from the buffered protocol data units; and reassembling the header-removed protocol data units into the service data units to be transferred through an unacknowledged service access point.

36. The method of claim 35, wherein the at least one logical channel includes a shared control channel, a common control channel, a dedicated control channel, and/or a dedicated traffic channel if the method is implemented in a user equipment.

37. The method of claim 35, wherein the at least one logical channel includes a dedicated control channel and a dedicated traffic channel if the method is implemented in a UTRAN (universal terrestrial radio access network).

38. The method of claim 22, wherein the transmission acknowledged entity performs:

segmenting and/or concatenating the service data units received through an acknowledged service access point for conversion into the protocol data units, each protocol unit having a predetermined length, adding the header to a corresponding protocol data unit, storing the header-added protocol data units, outputting the stored header-added protocol data units if a positive confirmation is made by a same peer RLC entity, and/or deleting the stored header-added protocol data units if a negative confirmation is made by the same peer RLC entity, the header-added protocol data units, and buffering the multiplexed protocol data units for transfer through at least one logical channel; and/or the reception acknowledgement entity performs:

buffering the protocol data units received through the at least one logical channel, acknowledging a successful reception to the same peer RLC entity or requesting a retransmission of the protocol data units, and reassembling the protocol data units after header removal for transfer through an acknowledged service access point.

39. The method of claim 38, wherein the at least one logical channel includes a dedicated control channel and a dedicated traffic channel if the method is implemented in a user equipment or a UTRAN (universal terrestrial radio access network).

40. The method of claim 22, wherein the transmission transparent entity has a function of segmenting the service data units into the protocol data units and a function of transmitting the protocol data units as a user data.

41. The method of claim 22, wherein the reception transparent entity has a function of transmitting the protocol data units as a user data.

42. The method of claim 22, wherein the transmission unacknowledged entity has a function of segmenting and/or concatenating the service data units into the protocol data units, and/or a function of padding the protocol data units, and a function of transmitting, the protocol data units as a user data.

43. The method of claim 22, wherein the reception unacknowledged entity has a function of transmitting the protocol data units as a user data.

44. The method of claim 22, wherein the transmission acknowledged entity has a function of segmenting and/or concatenating the service data units into the protocol data units, and/or a function of padding the protocol data units, a function of transmitting of transmitting the protocol data units as a user data, a flow control function, an error correction function, and/or a protocol error correction and/or recovery function.

45. The method of claim 22, wherein the reception acknowledged entity has a function of reassembling the protocol data units into the service data units, an error correction function, a flow control function, an in-sequence delivery function of upper layer protocol data units, a duplication detection function, and/or a protocol error correction and/or recovery function.

46. A method for performing at least one function in a radio link control (RLC) layer, the method comprising:

converting the service data units to protocol data units by a transparent entity and/or reassembling the protocol data units into service data units by the transparent entity;

converting the service data units into a plurality of protocol data units, and adding a header to the protocol data units by an unacknowledged entity and/or removing the header from the protocol data units and reassembling the header-removed protocol data units into service data units by the unacknowledged entity; and converting the service data units into protocol data units, and adding a header to the converted protocol data units for transmission and/or retransmission by an acknowledged entity and/or carrying out an error correction on received protocol data units and reassembling the received protocol data units into service data units after header removal by the acknowledged entity.

47. The method of claim 46, wherein the service data units are mapped to one of transparent and unacknowledged service access points provided by the radio link control layer if characteristics of the service data units include broadcast, paging, and notification information or is mapped to one of the transparent service access point, the unacknowledged access point, and an acknowledged service access point if the characteristics of the service data units include an establishment/release information for connection and transmission of the service data units.

48. The method of claim 46, wherein the function of transparent entity comprises:

segmenting the service data units received from an upper layer into header-free protocol data units;

receiving the header-free protocol data units from a lower layer; and reassembling the received header-free protocol data units into the service data units.

49. The method of claim 46, wherein the function of the unacknowledged entity comprises:

segmenting and/or concatenating the service data units received from an upper layer into the protocol data unit;

a header to a corresponding protocol data unit;

buffering the protocol data units received from the lower layer;

removing the header from the received protocol data units; and reassembling the protocol data units after header removal into the service data units.

50. The method of claim 46, wherein the function of the acknowledged entity comprises:

segmenting and/or concatenating the service data units received from an upper layer into the protocol data unit;

a header to a corresponding protocol data unit;

performing a flow control according to a flow state information from a same peer radio link control entity;

performing an error correction and/or retransmission according to whether a positive or negative confirmation is made by the same peer radio link control entity;

transferring the protocol data units to the lower layer;

buffering the protocol data units received from the lower layer;

removing the header from the protocol data units;

detecting errors of the protocol data units;

detecting whether the protocol data units duplicate or not;

providing the same peer link control entity with a flow state information of the protocol data units;

reassembling the protocol data units into the service data units; and transferring the reassembled service data units to the upper layer consecutively.

51. The method of claim 46, further comprising mapping a plurality of logical channels to the entities of the radio link control layer.

* * * * *